United States Patent [19]

Coates

[11] 4,391,715

[45] Jul. 5, 1983

[54] WASTE TREATMENT PROCESS

[75] Inventor: Colin F. Coates, Northumberland, England

[73] Assignee: Sterling Drug Inc., New York, N.Y.

[21] Appl. No.: 292,404

[22] Filed: Aug. 13, 1981

[51] Int. Cl.$^3$ .............................................. C02F 1/72
[52] U.S. Cl. .................................... 210/696; 210/759; 210/763
[58] Field of Search ............... 210/759, 749, 757, 763, 210/909, 917, 696

[56] References Cited

U.S. PATENT DOCUMENTS 4,268,397 5/1981 Horie et al. .......................... 210/759
4,280,914 7/1981 Knorre et al. ....................... 210/759
4,340,490 7/1982 Junkermann et al. ............... 210/759

FOREIGN PATENT DOCUMENTS 2853063 6/1980 Fed. Rep. of Germany ...... 210/759

OTHER PUBLICATIONS

Morrison and Boyd, *Organic Chemistry*, Diazonium Salts Replacement by H, section 23.15, 3rd Edition, May 1974.

*Primary Examiner*—Ivars C. Cintins
*Assistant Examiner*—Sharon T. Cohen
*Attorney, Agent, or Firm*—Thomas L. Johnson; B. Woodrow Wyatt

[57] ABSTRACT

Treatment of aqueous waste liquors containing diazonium salts with sulfite ions decomposes the diazonium salts without the formation of undesirable tar or foam, yielding a liquor amenable to further treatment with an oxidizing agent, e.g. hydrogen peroxide, to yield an effluent suitable for discharge to the environment.

9 Claims, No Drawings

WASTE TREATMENT PROCESS

BACKGROUND OF THE INVENTION

This invention relates to the treatment of waste liquors containing diazonium salts.

Requirements are increasingly being placed on the chemical industry to dispose of waste liquors in a manner which is considered to be environmentally acceptable. These requirements apply to the dumping of waste on land or at sea, but are particularly severe in their control of the disposal of wastes via the drainage system into inland waterways or coastal waters. Thus, a method of treating waste liquor must at least be able to produce an effluent which may be disposed of by dumping, and preferably also by the more convenient route of discharging into the local drainage system.

Diazonium salts are extensively used in the chemical industry, finding application in the fields of synthesis of aromatic compounds and synthesis of azo dyes, and thus there is a common occurrence of waste liquors containing diazonium salts. Such liquors are generally quite unsuitable for direct release to the environment, whether by dumping or by disposal via the drainage system, firstly because diazonium salts themselves are generally somewhat toxic, and secondly because the liquors are generally aqueous, and most diazonium salts steadily react in aqueous solutions to give, inter alia, a dark colored tar or foam which may be difficult to separate from the liquid part of the liquor.

The tendency of the diazonium salts to decompose to produce a tar or foam may also prevent treatment of the liquor to deal with other environmentally unacceptable components therein. For instance, waste liquors containing diazonium salts often also contain phenolic compounds, and it has been found that attempts to treat the phenolic compounds with an oxidizing agent only increase the evolution of the tar or foam. Attempts to neutralize acidic liquors containing diazonium salts also increase the evolution of the tar and foam.

Thus it is highly desirable to find a method of treating waste liquors containing diazonium salts in order to increase their environmental acceptability, and any such treatment should both reduce the toxicity of the liquor and prevent the diazonium salts therein from decomposing to give a tar or foam.

Very many different reactions of diazonium salts are known in the literature, but on the whole these are unsuitable as methods of treating waste liquors, usually by reason of expense or of the environmental unacceptability of the reagents involved. However, it has now surprisingly been discovered that diazonium salts may be converted into products which do not give rise to tar and foam formation, and which are either less toxic than themselves or may be converted into products that are less toxic than themselves, by reaction with a reagent which is readily available and itself gives rise to no significant problem of waste disposal.

SUMMARY OF THE INVENTION

This invention relates to a process for preventing tar or foam formation in an aqueous waste containing diazonium salts, thereby rendering said waste liquor suitable for disposal or further treatment, which comprises treating said waste liquor with sulfite ions in amount sufficient to decompose substantially all of the diazonium salts in said waste liquor.

A further aspect of the invention relates to a process for treating an aqueous waste containing diazonium salts while preventing tar or foam formation, which comprises adding to said aqueous waste sulfite ions in amount sufficient to decompose substantially all of the diazonium salts, and then treating the resulting mixture with an oxidizing agent, preferably hydrogen peroxide.

DETAILED DESCRIPTION INCLUSIVE OF PREFERRED EMBODIMENTS

The reaction between the diazonium salt and the sulfite ions may very satisfactorily be conducted without any heating or cooling of the liquor.

It is preferred to conduct the reaction in an acidic medium, very preferably at a pH of from 2-4. Following the treatment with sulfite ions, the pH of the waste liquor may if necessary be adjusted by the addition of a mineral acid. It is generally preferred to use hydrochloric acid or sulfuric acid, for this does not introduce environmentally unacceptable anions into the liquor.

The sulfite should be added in a form which is soluble in the waste liquor. The liquor is generally aqueous, so that the sulfite may usually be added as a water soluble metal sulfite or as sulfur dioxide gas.

It is preferred to employ a metal sulfite, but care should be taken to choose a salt which does not introduce environmentally unacceptable metal ions into the waste liquor. Alkali metal sulfites met the requirements of water solubility and environmental acceptability, and sodium sulfite is preferred.

The metal sulfite is preferably introduced as an aqueous solution, preferably containing about 15% by weight of the sulfite.

It is highly desirable to add sulfite to the waste liquor in a quantity sufficient to react with substantially all of the diazonium salt present. However, it is preferred not to use a significant excess of sulfite, as the unreacted excess may lessen the effectiveness of any subsequent treatment of the waste liquor involving an oxidizing agent. If for any reason an excess of sulfite is employed, it is preferred to allow the liquor to stand before subsequent treatment, in order that the sulfite may decompose. A standing time of 12-24 hours is normally sufficient.

It has been found that treatment of waste liquors containing diazonium salts with sulfite ions in accordance with the invention largely prevents the formation of environmentally unacceptable tar and foam.

The present invention may be advantageously applied to the treatment of waste liquors containing phenolic compounds (phenolic waste liquors) as well as diazonium salts. Phenolic compounds are well known to be toxic, for instance a typical upper limit on their presence in a waste liquor to be disposed of via the drainage system is 100 mg/liter, and it is known to treat phenolic wastes with oxidizing agents so as to break down the phenolic compounds into products of greater environmental acceptability. It now has been found that where a waste liquor contains phenolic compounds and diazonium salts it is possible to break down the phenolic compounds without causing the diazonium salts to produce tar or foam, if the waste is first treated in accordance with the invention.

The treatment of waste liquors in accordance with the invention may well also reduce the toxicity of the liquor. However, if it is found that because of an unacceptably high concentration of phenylhydrazines, produced by reduction of the diazonium salts, the toxicity of the liquor is not sufficiently reduced by the treatment with sulfite, a supplementary step of breaking down the phenylhydrazines may be employed.

It is convenient to break down the phenylhydrazines with an oxidizing agent, since in cases where the liquor contains phenolic compounds these may also be broken down with an oxidizing agent such as oxygen or an inorganic oxidizing agent.

The oxidizing agent of choice is hydrogen peroxide, which despite being somewhat expensive has the important advantage that it does not introduce harmful substances into the waste liquor, being reduced merely to give water. Furthermore, hydrogen peroxide will break down phenolic compounds (where present) as well as phenylhydrazines.

The oxidation is preferably performed in an acidic medium and most preferably at a pH of from 2–4. The pH may be adjusted as for the sulfite treatment.

Where the oxidizing agent employed is hydrogen peroxide the reaction is preferably carried out in the presence of ferric and/or ferrous ions, most preferably at a total concentration of from 50–150 ppm.

The hydrogen peroxide is preferably added in a stoichiometric amount, avoiding as far as possible an excess with respect to the total phenolic compound and phenylhydrazine concentration in the liquor. It is conveniently added in aqueous solution, preferably containing about 35% by weight of hydrogen peroxide.

It is believed that oxidation converts phenolic compounds (where present) into a mixture of poly-hydroxy compounds and non-aromatic breakdown products such as carboxylic acids and carbon dioxide, and phenylhydrazines into the corresponding benzene compounds.

The present invention has an especially advantageous application in the treatment of a particular waste liquor occurring in the course of a process for preparing para-nitroso-phenol, which is useful as an intermediate in organic synthesis.

In the past, attempts have been made to prepare para-nitroso-phenol on a commercial scale by reacting phenol in an aqueous medium with nitrous acid in the presence of sulfuric acid. The formed para-nitroso-phenol product is substantially insoluble in the reaction medium and is easily removed as a solid, leaving the mother liquor as a waste to be disposed of. This waste liquor resulting from the nitrosation of phenol will be referred to herein as "nitroso liquor".

Nitroso liquor contains phenolic compounds, which make it unsuitable even for dumping at sea. For instance, when the nitrosating step is performed under preferred conditions—that is by treating an aqueous solution containing 20–30% by weight phenol with a 37% by weight aqueous solution of nitrous acid in the presence of 16% by weight of sulfuric acid—the nitroso liquor formed has a pH of about 1–2, and contains about 0.05% of unreacted phenol, about 0.05% of p-nitroso-phenol (present at its solubility limit), about 0.1% of p-nitro-phenol and about 2–3% of sulfate ions.

Attempts have accordingly been made to treat the liquor with hydrogen peroxide so as to deal with the phenolic compounds. However, all such attempts have completely failed, for the immediate result of adding the hydrogen peroxide is to produce great quantities of a dark colored non-dispersible foam. The foam also occurs when the liquor is treated in other ways, for instance by heating, and for a considerable time the formation of this foam has prevented the successful treatment of nitroso liquor. It has however now unexpectedly been discovered that the foam formation is due to the previously unrecognized presence in the nitroso liquid of a varying but significant amount (usually from 1 to 5%) of an unusually stable diazonium salt.

It is believed that this salt causes the foam by forming a co-polymer with other monomer units in the liquor such as the phenolic compounds, and at the same time releasing nitrogen to froth flotate the polymer into the foam. The unusual stability of the diazonium salts present in the nitroso liquor is testified by the fact that foaming still occurs even if the liquor is treated with hydrogen peroxide or alkali after having been left to stand for 24 to 48 hours.

Having discovered that the foaming of nitroso liquor is due to the presence of a diazonium salt, it has been further discovered that the foaming can be prevented by reacting the salt with sulfite, in accordance with the method of the invention, prior to the treatment of the liquor so as to deal with its content of phenolic compounds.

The sulfite treatment of nitroso liquor may advantageously be carried out according to the preferred conditions described above for waste liquors in general. If however it is found necessary to adjust the pH of the liquor, this can be done either with hydrochloric acid or (provided this does not aggravate the sulfate disposal problem) with sulfuric acid.

Treatment of the nitroso liquor with sulfite under preferred conditions will substantially decrease the toxicity of the liquor, but it is much preferred to decrease the toxicity of the liquor still further by breaking down the phenolic compounds. This is advantageously achieved by oxidation in the manner described above.

It is believed that upon treatment with sulfite the diazonium salt in the nitroso liquor is converted to a phenylhydrazine. Whatever the product formed, it is preferred to break it down by employing an excess of hydrogen peroxide over and above that required to break down the phenolic compounds. The extent of the excess will depend on the amount of the product in the liquor, which can be estimated from the amount of sulfite employed to form the product.

It has been found that by application of the present invention, the environmental acceptability of waste liquors containing diazonium salts can normally be improved to a level which allows the resulting effluent to be disposed of after being brought to a neutral pH via the drainage system—always providing of course that the liquor does not originally contain other unacceptable substances. In fact, although the effluent resulting from the treatment of nitroso liquor can be dumped by land or at sea, it does contain unacceptable levels of sulfate ion for disposal via the drainage system. Thus if the effluent resulting from the treatment of nitroso liquor is to be disposed of via the drainage system, it should first be treated to lower its sulfate concentration, preferably to below the normal maximum allowed level of 1200 ppm. This may conveniently be effected by dilution of the effluent with other wastes, or by treatment with calcium ions in order to precipitate the sulfate as calcium sulfate. The calcium ions may be introduced as calcium chloride.

The invention will now be further described by the following Example, which however is given by way of illustration only.

EXAMPLE (a) Preparation of para-nitroso-phenol and the concomitant formation of nitroso liquor.

1223 g of 18% w/w sulfuric acid was cooled externally to 0° C., and 270 g of phenol added. The mixture was cooled externally, and 140 g of ice was added to the mixture to aid the cooling. After stirring the mixture for 10 mixture at 0° C., 610 cm$^3$ of a 37% w/w aqueous sodium nitrite solution was added over 3 hours, keeping the temperature at 0° C. by the addition of 2000 g of ice. At the end of the addition the mixture was stirred for a further 30 minutes, and the formed precipitate (crude para-nitroso-phenol) was filtered off to leave the filtrate, being nitroso liquor.

(b) Treatment of nitroso liquor.

To the nitroso liquor obtained above (being 1 volume) was added 1/6 volume of a 15% w/w aqueous sodium sulfite solution. The pH of the mixture was adjusted to 3 by addition of sulfuric acid, and the mixture allowed to stand for a period of 18 hours in order to allow any excess sulfite to decompose. 1/70 volume of a 35% w/w aqueous hydrogen peroxide solution was then added, with sufficient ferric sulfate catalyst to give a concentration in the formed mixture of 100 ppm. A temperature rise of 30° C. was noted, and the pH of the mixture was 3. After 5 hours the pH of the mixture was adjusted to 7 with a 46% w/v aqueous sodium hydroxide solution, to give an effluent which may be disposed of by dumping at sea.

It has been found that a typical reduction in the concentration of para-nitroso-phenol when nitroso liquor is treated as described above is from 6000 ppm to 1000 ppm. The concentration of phenol is typically reduced by about the same proportion.

I claim:

1. A process for preventing tar or foam formation in an aqueous waste containing diazonium salts, thereby rendering said waste liquor suitable for disposal or further treatment, which comprises treating said waste liquor with sulfite ions in amount sufficient to decompose substantially all of the diazonium salts in said waste liquor.

2. A process according to claim 1 in which the pH of the aqueous waste is adjusted to a value between 2 and 4 following the treatment with sulfite ions.

3. A process according to claim 2 in which the sulfite ions are provided in the form of an alkali metal sulfite.

4. A process according to claim 1 in which the aqueous waste containing diazonium salts is the mother liquor derived from the reaction of phenol with nitrous acid to obtain p-nitroso-phenol.

5. The process for treating an aqueous waste containing diazonium salts while preventing the formation of tar or foam, which comprises adding to said aqueous waste sulfite ions in amount sufficient to decompose substantially all of the diazonium salts, and then treating the resulting aqueous mixture with an oxidizing agent.

6. The process according to claim 5 in which the oxidizing agent is hydrogen peroxide.

7. The process according to claim 6 in which a catalytic amount of ferric or ferrous ions are added.

8. The process according to claim 5 in which the pH of the aqueous waste is maintained at a value between 2 and 4 throughout the entire process.

9. The process according to claim 5 in which the aqueous waste containing diazonium salts is the mother liquor derived from the reaction of phenol with nitrous acid to obtain p-nitroso-phenol.

* * * * *